United States Patent Office 2,799,617
Patented July 16, 1957

2,799,617

PIPERAZINE ADIPATE COMPOSITIONS AND TREATMENT OF HELMINTH INFECTIONS THEREWITH

James Forrest and Vladimir Petrow, London, England, assignors to The British Drug Houses Limited, London, England, a British company No Drawing. Application October 19, 1954,
Serial No. 463,317

Claims priority, application Great Britain
October 21, 1953

4 Claims. (Cl. 167—55)

This invention is for improvements in or relating to piperazine compounds and has particular reference to the preparation of a piperazine derivative for the treatment of helminth infections which occur in man and in domestic animals.

The successful use of piperazine hydrate in the treatment of threadworm infections in children was first noted by Mouriquand, Roman and Coisnard (J. med. Lyon, 1951, 32, 189), and the results obtained by these workers have recently been confirmed by White and Standen (Brit. Med. J., 1953, 4839, 755). The use of piperazine hydrate for medicinal purposes, however, is subject to the following objections which lower its value as a pharmaceutical product, (i) the material forms hydroscopic plates, M. P. 44° C., which are difficult to obtain pure and to handle, as the product rapidly absorbs moisture and carbon dioxide from the air, (ii) the compound has an objectionable taste and is strongly alkaline in solution. Thus a 5% solution in water has a pH of 12 (iii) it is relatively unstable on storage, slowly darkening and decomposing on exposure to light and air, and (iv) it cannot be tableted and is thus unsuitable for issue as a solid preparation.

Various attempts have been made to overcome the disadvantages associated with the use of piperazine hydrate as a medicinal. Thus Turpin, Cavier and Savaton-Pillet (Therapie, 1952, 7, 108) proposed the use of piperazine bis-phenylacetate orally together with concomitant use of piperazine suppositories. This cannot, however, be considered as a solution to the problem for the following reasons, (i) the bis-phenylacetate contains only 25% piperazine, so that the dosage of the salt required to effect a cure is large, (ii) the salt has an unpleasant urinary odour which renders it unpalatable to many patients.

We have examined a number of derivatives of piperazine. We now find that the compound piperazine adipate has unexpected and unobvious properties which make it of value as an anthelmintic agent. It has a lower acute oral toxicity than has piperazine hydrate.

On the basis of its piperazine content, piperazine adipate is a more effective anthelmintic agent than piperazine hydrate. Thus it is as effective at a dose level of 100 mg./kg. as piperazine hydrate is at a dose level of 340 mg./kg. in clearing cats and dogs from ascarid infections and dogs from tropical hookworm infestations.

Adipates have not been previously employed in pharmaceutical practice.

The pharmaceutical advantages piperazine adipate possesses over piperazine hydrate are briefly as follows: (i) it forms cubic crystals, M. P. 249 to 251° C. (with decomposition), which are readily obtained in a pure condition directly from technical piperazine hydrate by procedures such as the one hereinafter indicated in the specific example, (ii) the salt has a pleasant acidulous taste, (iii) the material is superior to piperazine hydrate in stability in the presence of light and air and (iv) it is readily made up in the form of, for example, tablets.

The pharmaceutical advantages piperazine adipate possesses over piperazine bis-phenyl acetate are (i) the material contains 37% piperazine compared with only 25% piperazine in the case of the phenylacetate. This factor is of importance as the dosage required, based on piperazine, is rather high, (ii) the material is essentially without odour in contrast to the phenylacetate salt which possesses an unpleasant odour and (iii) the taste of the adipate is much more pleasant than that of the phenylacetate.

Preliminary biological and clinical studies reveal that piperazine adipate is an effective anthelmintic agent against a variety of helminth infections which occur in humans and in domestic animals. Thus, it is effective against Oxyuris, in man, Uncinaria stenocephale in dogs, Toxocara mystax and Toxascaris leonina in cats, Ascaris lumbricoides and Oesophagostorium spp. in pigs, Parascaris equorum, Oxyuris equi and Small strongyles in ponies and against Ascaridia galli in poultry.

Piperazine adipate is suitable for administration for example in the form of tablets, suppositories or suspensions. The material may be associated with a solid or liquid carrier. The compositions may take the form of active material (piperazine adipate) admixed with compatible solid diluents and/or tableting adjuvants such for example as lactose, starch or magnesium stearate. Alternatively, for veterinary use, the adipate may be administered in powder form admixed with the diet.

The invention, therefore, provides as a new anthelmintic product piperazine adipate.

According to the present invention there is further provided a method for the preparation of piperazine adipate which method comprises adding with mixing an equimolar quantity of adipic acid dissolved in a solvent to piperazine hydrate also dissolved in a solvent.

The solvent in each case may be industrial spirit and the resulting piperazine adipate separates out in an essentially pure condition.

The addition may be conveniently carried out employing solutions at initial temperatures of 40 to 50° C.

Following is a description by way of example of methods of carrying the invention into effect.

EXAMPLE I

Technical piperazine hydrate (4.13 kg.) was dissolved by heating in industrial methylated spirit (4.3 l.) and the hot solution filtered from any suspended material. To this solution was added as quickly as possible with stirring (the exothermic reaction controlling the rate of addition) a warm filtered solution of adipic acid (2.95 kg., i. e. 1 molecular proportion), in industrial methylated spirit (12.5 l.). After a few minutes stirring on completion of the addition of acid, the white crystalline paste of piperazine adipate was filtered off hot by suction and washed twice with industrial methylated spirit (2 portions each of 5 l.). The product so obtained was sufficiently pure for use directly in pharmaceutical preparations.

The following examples illustrate some typical formulations in which the preferred dosage unit of the new piperazine salt for the treatment of threadworm and similar infestations in man (300 milligrams) is employed.

EXAMPLE II

Tablets

| | |
|---|---|
| Piperazine adipate | mg__ 300.0 |
| Lactose | mg__ 19.5 |
| Maize starch | mg__ 58.5 |
| Maize starch paste 10% | q. s. |
| Magnesium stearate | mg__ 7.8 |
| Dried maize starch sufficient to produce | mg__ 390.0 |

The first three ingredients are mixed and granulated with the starch paste followed by drying. The lubricant (magnesium stearate) is then incorporated and sufficient dried starch added to make up to weight. Tableting is carried out on a rotary machine.

EXAMPLE III

Capsules

| | |
|---|---|
| Piperazine adipate _____ mg__ | 300 |
| Lactose _____ | q. s. |

The lactose is mixed to produce a volume of powder to just fill a two-piece hard gelatin capsule.

EXAMPLE IV

Cachets

Piperazine adipate is compounded as in Example III and the resultant powder filled into "wet seal" or "dry seal" cachets.

EXAMPLE V

Oral suspension

| | Grams |
|---|---|
| Sodium carboxymethyl cellulose low viscosity (15 to 30 cps. in 1% solution of undried material)__ | 1.80 |
| Polyoxyethylene sorbitan monooleate (Tween 80) | 0.45 |
| Piperazine adipate_____ | 0.60 |
| Soluble saccharin_____ | 0.02 |
| Yellow confectionery colour_____ | 0.02 |
| Banana flavour_____ | 0.10 |
| Sucrose sufficient to produce_____ | 25.00 |

The addition of 80 ml. of chloroform water to 25 grams of the dry powder produces 100 ml. of suspension containing in each teaspoonful (3.5 ml.) 300 mg. of piperazine adipate.

The polyoxyethylene sorbitan mono-oleate is adsorbed on the powdered sodium carboxymethyl cellulose (No. 200 sieve) which is then mixed with the finely powdered piperazine salt (No. 300 sieve). The colouring and flavouring are triturated with the sucrose (finest castor bulk) followed by thorough blending of the two mixtures.

EXAMPLE VI

Suppositories (oily base)

Piperazine adipate
Deodorized cocoa butter sufficient for one suppository

The finely powdered piperazine adipate (No. 200 sieve) is triturated to a smooth paste with part of the melted cocoa butter. The remainder of the cocoa butter is gradually added with constant stirring and the resultant suspension is poured into a previously calibrated mould.

EXAMPLE VII

Suppositories (water soluble base)

Piperazine adipate.
Water soluble base (sufficient for one suppository).

| | |
|---|---|
| Polyethylene glycol 4000_____g__ | 33.33 |
| Polyethylene glycol 1000_____g__ | 66.66 |

Finely powdered piperazine adipate (No. 200 sieve) is triturated with part of the warm liquefied base to form a smooth suspension. After slowly adding the remainder of the base the suspension is poured into a previously calibrated mould.

We claim:

1. A method of combatting helminth infection in man and animals comprising administering to the host having such infection a composition comprising an amount of piperazine adipate sufficient to produce anthelmintic action.

2. A veterinary feed having anthelmintic properties comprising piperazine adipate admixed with an animal feed.

3. A therapeutic composition in dosage unit form having anthelmintic properties comprising piperazine adipate, and at least one member selected from the group consisting of sucrose, lactose, starch and magnesium stearate.

4. A therapeutic composition having anthelmintic properties comprising piperazine adipate in a suppository base.

References Cited in the file of this patent

Lieser: Chemical Abstracts, vol. 40, 1946, p. 4729 (4).
Pollard: Chemical Abstracts, vol. 28, 1934, p. 6150 (6).
White et al.: British Medical Journal, Oct. 3, 1953, pp. 755–758.
Pollard: Journal Am. Chem. Soc., vol. 56, p. 150, 1934.